(12) United States Patent
Belt et al.

(10) Patent No.: US 8,271,817 B2
(45) Date of Patent: Sep. 18, 2012

(54) INFORMATION HANDLING SYSTEM WITH PROCESSING SYSTEM, LOW-POWER PROCESSING SYSTEM AND SHARED RESOURCES

(75) Inventors: Steven L. Belt, Pflugerville, TX (US); Andrew T. Sultenfuss, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 13/242,635

(22) Filed: Sep. 23, 2011

(65) Prior Publication Data

US 2012/0013795 A1 Jan. 19, 2012

Related U.S. Application Data

(63) Continuation of application No. 12/262,965, filed on Oct. 31, 2008, now Pat. No. 8,037,333.

(51) Int. Cl.
*G06F 1/32* (2006.01)

(52) U.S. Cl. ........................................ 713/323; 713/330

(58) Field of Classification Search .......... 710/300–304, 710/306, 310; 713/300, 212
See application file for complete search history.

(56) References Cited

U.S. PATENT DOCUMENTS

| | | | |
|---|---|---|---|
| 4,720,798 A | 1/1988 | Reed et al. | |
| 4,747,041 A | 5/1988 | Engel et al. | |
| 4,809,163 A | 2/1989 | Hirosawa et al. | |
| 5,251,320 A | 10/1993 | Kuzawinski et al. | |
| 5,303,171 A | 4/1994 | Belt et al. | |
| 5,586,270 A | 12/1996 | Rotier et al. | |
| 5,644,760 A | 7/1997 | Polzin et al. | |
| 5,727,231 A | 3/1998 | Bartley et al. | |
| 5,748,912 A | 5/1998 | Lee | |
| 5,835,732 A * | 11/1998 | Kikinis et al. | 710/303 |
| 5,951,688 A * | 9/1999 | Moyer et al. | 713/320 |
| 5,978,923 A | 11/1999 | Kou | |
| 5,999,997 A | 12/1999 | Pipes | |
| 6,029,211 A | 2/2000 | Nakashima | |
| 6,078,967 A | 6/2000 | Fulghum | |
| 6,131,166 A | 10/2000 | Wong-Insley | |
| 6,233,692 B1 | 5/2001 | Villanueva | |
| 6,457,129 B2 | 9/2002 | O'Mahony | |
| 6,523,079 B2 * | 2/2003 | Kikinis et al. | 710/303 |
| 6,549,968 B1 | 4/2003 | Hart | |
| 6,584,533 B1 * | 6/2003 | Cho et al. | 710/303 |

(Continued)

FOREIGN PATENT DOCUMENTS

EP   1 460 529 A2   9/2004

(Continued)

*Primary Examiner* — Raymond Phan
(74) *Attorney, Agent, or Firm* — Larson Newman, LLP

(57) ABSTRACT

An information handling system includes a processing system, a low-power processing system, and a chipset. The processing system is configured to operate using a power system configured to power a shared resource of the processing system and a non-shared resource of the processing system, and to disable the non-shared resource during a reduced operating state of the processing system. The low-power processing system is configured to access the shared resource of the processing system during operation of the low-power processing system, wherein the operation of the low-power processing system is separate from the operation of the processing system. The chipset includes a processor of the processing system and operable to be enabled during operation of the processing system, wherein the processor is configured to be disabled during operation of the low-power processing system.

20 Claims, 4 Drawing Sheets

U.S. PATENT DOCUMENTS

| | | |
|---|---|---|
| 6,584,849 B2 | 7/2003 | Tarr |
| 6,608,400 B1 | 8/2003 | Muehsam |
| 6,732,216 B2 | 5/2004 | Shaw |
| 6,735,708 B2 | 5/2004 | Watts, Jr. |
| 6,760,852 B1 | 7/2004 | Gulick |
| 6,898,727 B1 | 5/2005 | Wang et al. |
| 7,010,634 B2 * | 3/2006 | Silvester ............... 710/303 |
| 7,039,819 B1 | 5/2006 | Kommrusch et al. |
| 7,076,646 B2 | 7/2006 | Chang |
| 7,254,730 B2 | 8/2007 | Kardach et al. |
| 7,278,041 B2 | 10/2007 | Piel et al. |
| 7,281,148 B2 | 10/2007 | Munguia |
| 7,380,142 B2 | 5/2008 | Lee et al. |
| 7,634,780 B2 | 12/2009 | Rhoten et al. |
| 8,037,333 B2 * | 10/2011 | Belt et al. ............... 713/323 |
| 2003/0065734 A1 * | 4/2003 | Ramakesavan ............... 709/211 |
| 2003/0110306 A1 | 6/2003 | Bailis et al. |
| 2004/0088262 A1 | 5/2004 | Boucher et al. |
| 2004/0160435 A1 | 8/2004 | Cui et al. |
| 2004/0268005 A1 * | 12/2004 | Dickie ............... 710/303 |
| 2005/0066006 A1 | 3/2005 | Fleck et al. |
| 2005/0066207 A1 | 3/2005 | Fleck et al. |
| 2005/0138267 A1 | 6/2005 | Bains et al. |
| 2005/0240702 A1 | 10/2005 | Kunkel et al. |
| 2006/0026447 A1 | 2/2006 | Naveh et al. |
| 2006/0075491 A1 | 4/2006 | Lyon |
| 2006/0236014 A1 * | 10/2006 | Yin et al. ............... 710/303 |
| 2007/0030967 A1 | 2/2007 | Earnshaw |
| 2007/0094435 A1 | 4/2007 | Fry et al. |
| 2008/0004889 A1 | 1/2008 | Edwards et al. |
| 2008/0016167 A1 | 1/2008 | Lund et al. |
| 2008/0070593 A1 | 3/2008 | Altman et al. |
| 2008/0140872 A1 | 6/2008 | Wright |
| 2008/0272880 A1 | 11/2008 | Sutardja et al. |
| 2009/0125732 A1 | 5/2009 | Oya et al. |

FOREIGN PATENT DOCUMENTS

| | | |
|---|---|---|
| WO | WO 2007/004178 A1 | 1/2007 |

* cited by examiner

INFORMATION HANDLING SYSTEM WITH PROCESSING SYSTEM, LOW-POWER PROCESSING SYSTEM AND SHARED RESOURCES

CROSS REFERENCE TO RELATED APPLICATIONS

This application is a continuation of U.S. patent application Ser. No. 12/262,965, entitled "Information Handling System with Processing System, Low-power Processing System and Shared Resources," filed on Oct. 31, 2008, the disclosure of which is hereby expressly incorporated by reference in its entirety.

FIELD OF THE DISCLOSURE

This disclosure relates generally to information handling systems, and more particularly to an information handling system with integrated low-power processing resources.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWING

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

Figure 1:
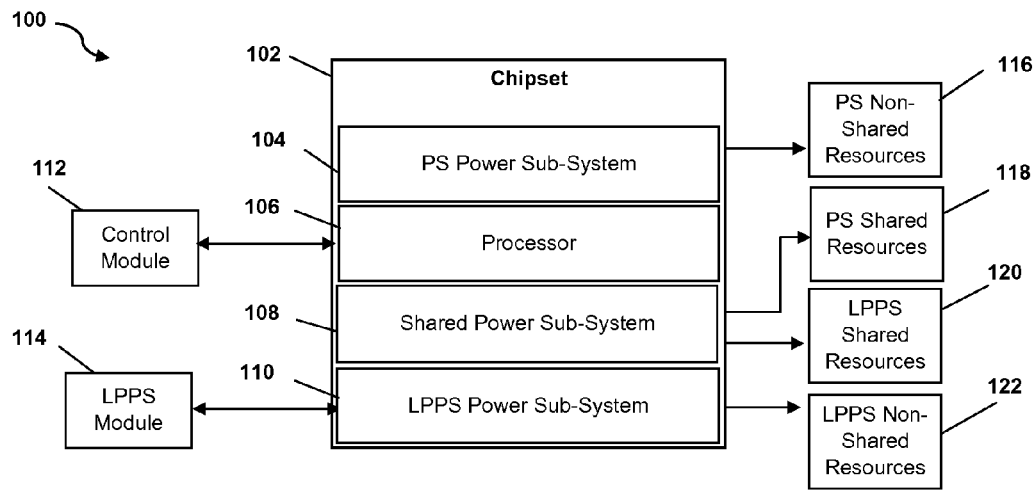
FIG. 1 illustrates a functional block diagram of an information handling system employing a low-power processing system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes, " "including, " "has, " "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect of the disclosure, an information handling system can include a processing system configured operate using a power system configured to power a shared resource of the processing system and a non-shared resource of the processing system. The information handling system can also include a low-power processing system configured to access the shared resource of the processing system during operation of the low-power processing system. The operation of the low-power processing system can be separate from the operation of the processing system. The information handling system can also include a chipset including a processor of the processing system and operable to be enabled during operation of the processing system. The processor can be configured to be disabled during operation of the low-power processing system.

According to another aspect of the disclosure, a chipset is disclosed. The chipset can include a processor configured to access a shared resource of a processing system during operation of the processing system. The chipset can further include a power system configured to enable a powering of the shared resource during operation of the processing system and operation of a low-power processing system.

According to a further aspect of the disclosure, an information handling system is disclosed. The information handling system can include a processing system configured to access a shared resource and a non-shared resource during operation of the processing system, and a low-power processing system configured to access the shared resource of the processing system during operation of the low-power processing system. The operation of the low-power processing system can be separate from operation of the processing system. The information handling system can also include a power system configured to power the processing system, the low-power processing system, the shared resource, and the non-shared resource. The information handling system can also include a chipset having a processor configured to access the shared resource of the processing system during the operation of the processing system, and a low power processor configured to access the shared resource of the processing system during the operation of the low-power processing system.

FIG. 1 illustrates a functional block diagram of an information handling system employing a low-power processing system according to an aspect of the disclosure. An information handling system, generally depicted at 100, can include a chipset 102 that can include a CPU such as a processor 106, memory, a basic input output system (BIOS), a an operating system (not illustrated). The chipset 102 can be used within the information handling system 100. The chipset 102 can also include a processing system (PS) power sub-system 104, a shared power sub-system 108, and a low-power processing system (LPPS) sub-system 110. The chipset 102 can be coupled to a control module 112, and an LPPS module 114. The chipset 102 can further be coupled to one or more PS non-shared resources 116, PS shared resources 118, LPPS shared resources 120, LPPS non-shared resources 122, or any combination thereof. According to one aspect, the processor 106 can be used as a primary processor of a processing system operable to use the resources of the information handling system 100 during full operation (e.g. high processing, high power consumption).

In a particular embodiment, the LPPS power sub-system 110 may only be used when the information handling system 100 is operating in a reduced power state. For example, the PS power sub-system 104 can be used with the information handling system is in any other state other than the low-power operating state used when the LPPS power sub-system 110 is used.

According to a particular aspect, a PS non-shared resource 116 that can be used by the information handling system 100 during a run time of the information handling system 100 can include local memory, floating point CPU capabilities, instructions, fetch routines, a primary operating system, other primary operating modules, security devices, primary applications, power system, regulation modules and circuits, applications that are also capable of being used during low power processing, and other resources that are used as primary resources during a run time of the information handling system 100, or any combination thereof.

According to a particular aspect, the PS shared resources 118 can include resources that can be accessed during a run time of the information handling system 100, and during a run time of the LPPS module 114. The PS shared resources 118 can include can include video, primary and secondary displays, keyboard, radio, touchpad, credentials, buses, applications that are also capable of being used during low power processing, thermal cooling and cooling systems, a backlight control of a display, touchpad, point stick, common buses, external I/O, disk drives, optical drives, batteries, I/O expander modules, smart card readers, and any combination thereof.

According to another aspect, a non-shared resource of the LPPS module 114 during a run time of the LPPS module 114 can include can include local memory, floating point CPU capabilities, instructions, fetch routines, a primary operating system, other primary operating modules, security devices, primary applications, power system, regulation modules and circuits, applications that are also capable of being used during low power processing, and other resources that are used as resources during a low-power processing of the information handling system 100, or any combination thereof.

According to a particular aspect, the LPPS shared resources 120 can include resources that can be accessed during a run time of the information handling system 100, and during a run time of the LPPS module 114. The LPPS shared resources 120 can include radio, video, storage, I/O ports, buses, context data, credentials, keyboard, biometrics, or any combination thereof.

According to another aspect, the LPPS shared resources 120 can also include radio emulations, transcoders, encryption applications, GPS applications, biometric applications, camera applications, USB concentrator applications, VOIP applications, persistent hardware assisted virtual management, wake events, system management applications, various other peripheral resource applications and devices, or any combination thereof.

In other forms, operation various other portions of the information handling system 100 can be altered during a normal operating state and a low-power operating state. For example, the chipset 102 can operate in a normal operating state where full power consumption of the chipset 102 can be realized. In other forms, the chipset 102 can be used in a low-power operating state to disable relative high power consumption of the chipset 102, and use only low-power resources to ensure low power consumption can be achieved. As such, the chipset 102 can still be enabled during low-power operations of the information handling system 100.

According to a further aspect, a resource of the shared resources 118, 120, the non-shared resources 116, 122, or any combination thereof, may be used in a normal operating state and a low-power operating state. For example, a display, data bus, wireless module, power-subsystem, or other resources, devices, components, or any combination thereof can be altered from high-power consumption to low-power consumption to enable low-power processing of the information handling system 100.

According to an aspect, the information handling system 100 can use the chipset 102 to enable and use resources 116, 118, 120, 122. For example, the LPPS module 114 can be used in an operating mode, and the processor 106 can be placed in standby, a low-operating state, sleep mode, off, etc. As such, the LPPS module 114 can access various resources while the processor 106 may not be used in a run time operating mode. The chipset 102 can be used to enable resources that can be accessed by the LPPS module 114. For example, the chipset 102 in combination with the shared power sub-subsystem 108 can enable one or more PS shared resources 118 to be used by the LPPS module 114. Additionally, the shared power sub-system 108 can be used to enable one or more LPPS shared resources 120 to be used by the LPPS module 114. The LPPS power sub-system 110 can also enable one or more LPPS non-shared resources 122 that can be accessed by the LPPS module 114. In this manner, the chipset 102 can be used to enable and disable resources when the processor 106 may be in a non-run time operating mode and the LPPS module 114 may be in a run-time operating mode.

According to another aspect, the control module 112 can be used to initiate enabling and disabling power within the information handing system 100 depending on the current or desired operating state of the processor 106 and the LPPS module 114. The control module 112 can be used with the chipset 102 to detect a current or desired operating condition of the information handling system 100, and enable and disable resources using the power systems and sub-systems of the information handling system 100. The control module 112 can be provided as a separate module external to the chipset 102, or according to another aspect can be integrated as a part of the chipset 102.

According to a further aspect, the information handling system 100 can be realized as a processing system when being used as in a high power consumption operating state. Further the information handling system 100 can be realized as a low power processing system when limited resources or features of the information handling system 100 are deployed in a sufficient manner to ensure a desired processing level and functionality can be achieved in a low-power operating environment.

Figure 2:
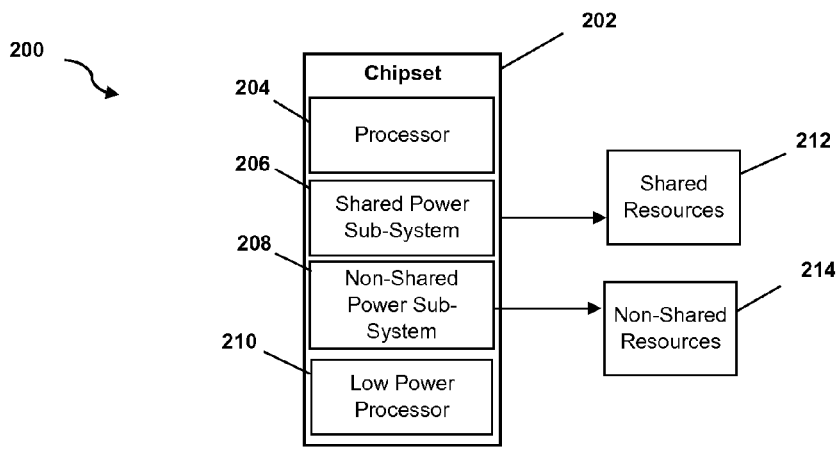
FIG. 2 illustrates a functional block diagram of a chipset incorporating a low power processor according to an aspect of the disclosure.

FIG. 2 illustrates a functional block diagram of a chipset incorporating a low power processor according to an aspect of the disclosure. An information handling system, illustrated generally at 200, can include a chipset 202 having a processor 204, a shared power sub-system 206, a non-shared power sub-system 208, and a low power processor 210. The chipset can be coupled to one or more shared resources 212 and one or more non-shared resources 214 as needed or desired. As illustrated, the low power processor 210 can be integrated as a part of the chipset 200, thereby foregoing the need to have a separate low power processor, low-power processing system, low-power processing system module, and the like, externally coupled to the chipset 202.

During operation, the processor 204 can be used to enable a processing system of the information handling system 100 that can be used in a run-time that can result in high level of power consumption relative to using the low power processor 210. As the processor 204 may be enabled, the shared power subsystem 206 can be used to enable one or more shared resources 212. Additionally, the non-shared power sub-system 208 can be used to enable one or more non-share resources 214. During use of the low power processor 210, a low-power processing system can be enabled and the processor 204 can be disabled. Additionally, one or more low power shared resources 212 can be enabled by the shared power subsystem 206 and one ore more low power non-shared resources 214 can be enabled by the non-shared power subsystem 208. The non-shared resources 214 when enabled during used of the low power processor 210 can be different from the non-shared resources 214 that can be enabled during used of the processor 204. However, according to an aspect, the shared resources 212 can be used by the processor 204 when enabled, or the low power processor 210, as needed or desired.

Figure 3:
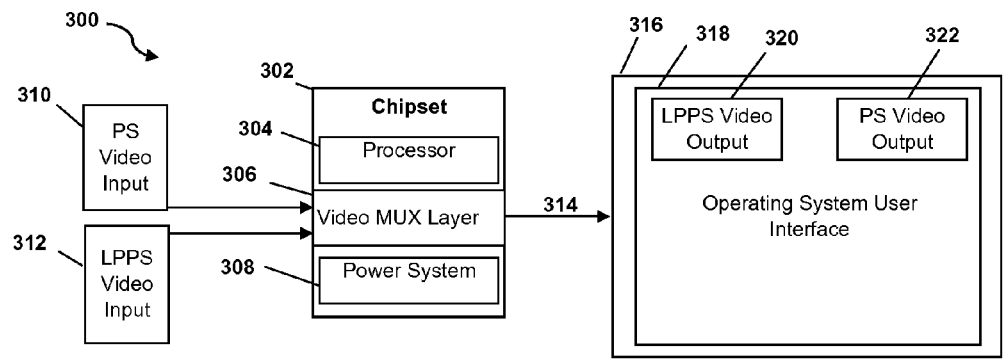
FIG. 3 illustrates a functional block diagram of information handling system employing a shared resource to output video from a low-power processing system source and a processing system source according to an aspect of the disclosure.

FIG. 3 illustrates a functional block diagram of an information handling system employing a shared resource to output video from a low-power processing system source and a processing system source according to an aspect of the disclosure. An information handling system, illustrated generally illustrated at 300, includes chipset 302 having a processor 304, a video MUX layer 306 within a memory buffer (not illustrated), and a power system 308. The power system 308 can include various power subsystems, power rails, power moats, etc. The video MUX layer 306 can be coupled to a processing system video input source 310, and an LPPS video input source 312. The chipset 302 and video MUX layer can be used to multiplex a video signal that can be output using a video output 314 to a display 316.

According to an aspect, the display 316 can output an OS user interface 318 such as a Windows® based graphical user interface, an Apple® or Mac OS® based user interface, or any other type of graphical user interface that can be presented using the display 316. The output 314 can be configured to output video using various types of video formats, resolutions, frame rates, etc. According to another aspect, the output 314 can be configured as a display port, a high definition media interface (HDMI) enabled port, or any combination thereof can be also used, and signals output can be converted as needed or desired. For example, the PS video input 310 can include a resolution that may be comparable to be displayed within the display 316. However, the LPPS video input 312 may have a resolution that is less than the resolution of the PS video input 310, the resolution of the display 316, or any combination thereof. As such, the chipset 302 can be used to process the LPPS video input 312 to upscale the resolution of the LPPS video input 312. The resulting up-scaled video can then be combined within the video MUX layer 306 and output to the video output 314 to be displayed within the display 316.

According to an aspect, the display 316 can further output an LPPS video output 320 using the LPPS video input 312, and a PS video output 322 using the PS video input 310. It is understood that the video input sources need not be motion picture video, but can include various graphical representations, visual outputs, etc. that can be displayed within the display 316.

Figure 4:
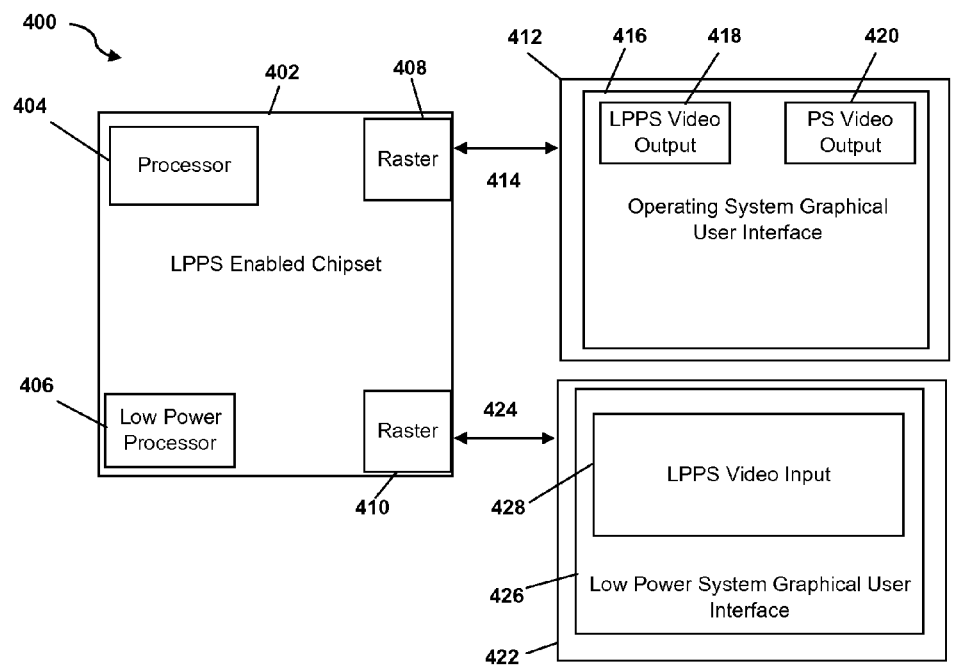
FIG. 4 illustrates a functional block diagram of a low-power processing system enabled chipset configured to output video to multiple video display resources according to an aspect of the disclosure.

FIG. 4 illustrates a functional block diagram of a low-power processing system enabled chipset configured to output video to multiple video display resources according to an aspect of the disclosure. An information handling system, illustrated generally at 400, can include an LPPS enabled chipset 402 that can include a processor 404 configured to be used during a run operating mode of the information handling system 400. The LPPS enabled chipset 402 can also include a low power processor 406 configured to be enable during a low power run operating mode of the information handling system 400. The LPPS enabled chipset 402 can further includes a video raster 408 and a video raster 410. The video raster 408 can be configured to output a video signal to a shared resource such as a display 412 using a video output 414. According to an aspect, the display 412 can output an OS user interface 416 such as a Windows® based graphical user interface, an Apple® or Mac OS® based user interface, or any other type of graphical user interface that can be presented using the display 412. The display 412 can further output an LPPS video output 418, and a PS video output 420. According to an aspect, either or both displays 412, 422 can be a touch screen enabled displays.

According to a further aspect, the LPPS enabled chipset 402 can also be coupled to a low power non-shared resource such as a display 422 using a video output 424. The display 422 can include a low-power processing system graphical user interface 426 configured to output an LPPS video output 428. According to an aspect, the low power processor 406 can process video to output using the video raster 410 to be output to the display 422. In other forms, the low power processor 406 can further be used to process video to be output to the display 412 and the LPPS video output 418. According to a further aspect, the video raster 408 and the video raster 410 can included within the LPPS enabled chipset 402. However in other forms, the video raster 408, 410 can be realized as a separated device or as a part of each display 412, 422 as needed or desired.

In another embodiment, a signal can be coupled to the LPPS enabled chipset 402 that can be used to selectively enable display 412, 422 or any combination thereof. For example, the signal can be used to identify a type of display installed, and a display classification can be determined and read. As such, a video output format can be determined to be output to the displays 412, 422.

Figure 5:
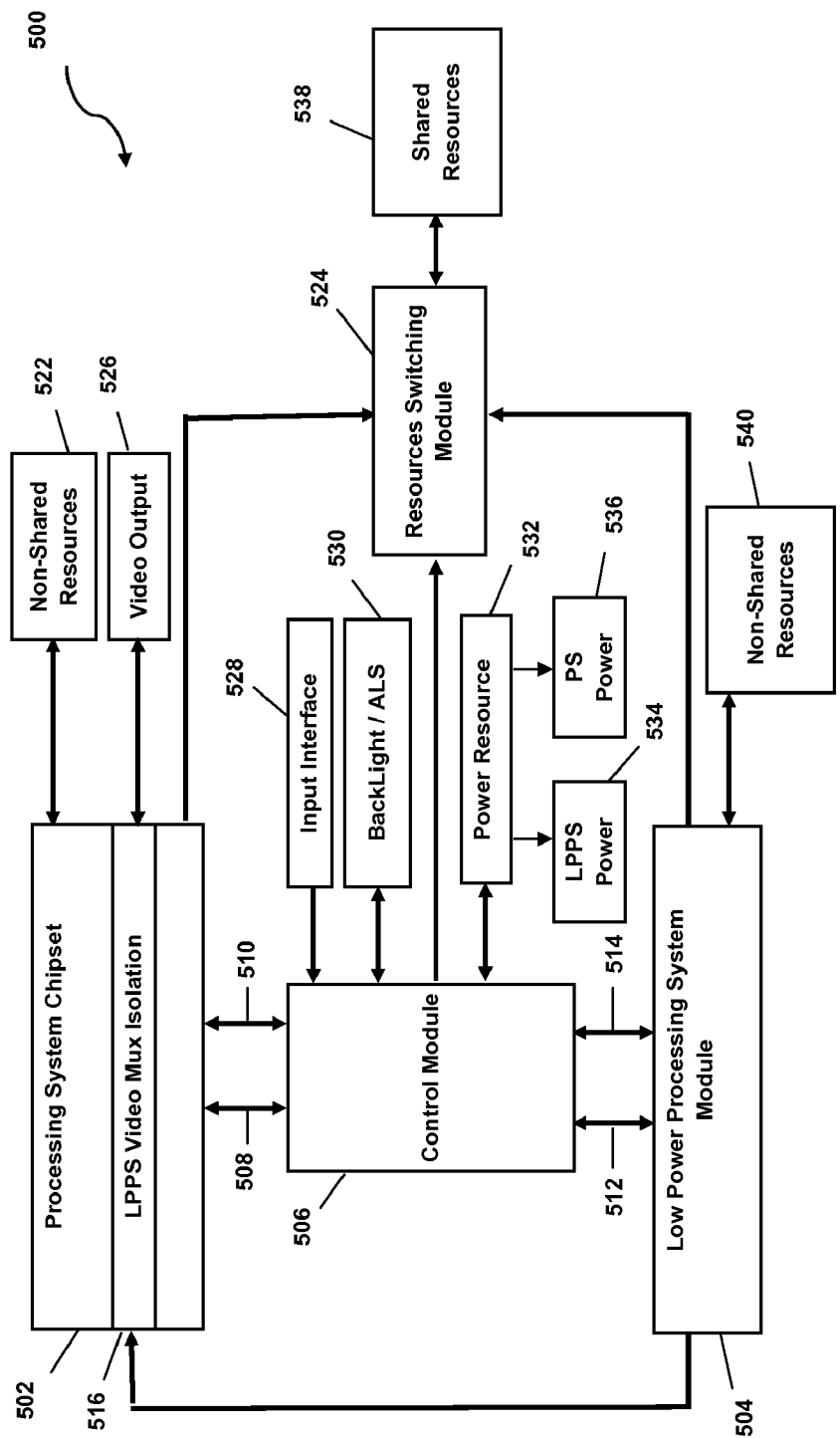
FIG. 5 illustrates a functional block diagram of an information handling system low-power processing system partially integrated within a chipset of a processing system according to an aspect of the disclosure.

FIG. 5 illustrates a functional block diagram of an information handling system low-power processing system partially integrated within a chipset of a processing system according to an aspect of the disclosure. According to an aspect, the information handling system, generally depicted at 500, can include a processing system chipset 502 that can include a CPU, a memory, an operating system and various other resources and components which can be combined to form an information handling system (not illustrated). The processing system chipset 502 can also include BIOS (not illustrated) operable to enable resources accessible to the processing system chipset 502. The information handling system 500 can also include a LPPS module 504, that can include a CPU, a CPU chipset, memory, and an operating system (not illustrated). The low-power processing system (LPPS) module 504 can also include a second BIOS (not illustrated) operable to enable resources accessible to the LPPS module 504. In an aspect, the LPPS module 504 can include BIOS extensions or inputs that can be commonly used by the processing system chipset 502.

According to an aspect, the processing system chipset 502 and the LPPS module 504 can be coupled to a control module 506 configured to enable resources that can be used as a part of a host environment 544 and a reduced power environment 546. For example, the processing system chipset 502 can be coupled to the control module 506 using a bus 508 and a bus 510. In a form, the bus 508 can include a low pin count (LPC) bus and the bus 510 can include a system management bus (SMBUS). Other types of buses can also be employed. Additionally, the LPPS module 504 can be coupled to the control module 506 using a bus 512 and a bus 514. In one form buses 508, 510, 512, 214 can include any combination of a personal system 2 (PS2) bus, an RS232 bus, a serial peripheral interface (SPI bus), SMBUS, LPC, or other types of buses, or any combination thereof.

According to an aspect, a peripheral interconnect (not illustrated) can also be coupled to the processing system chipset 502 and the LPPS module 504, such as a universal serial bus (USB), USB 3, PCI bus, base controller (BC) bus, a PCI express (PCIE) bus, Firewire®, Gigabit Ethernet, secure digital input output (SDIO), systems management (SM), a display bus, various other types of buses, or any combination thereof, that can be employed to connect the processing system chipset 502 to the LPPS module 504.

The processing system chipset 502 can also be coupled to non-shared resources 522 and a resource switching module 524. The processing system chipset 502 can be coupled to non-shared resources 522 and the resources switching module 524. According to an aspect, the non-shared resources 522 can include local resources that can be used by a processing system generated by the processing system chipset 502. Additionally, the LPPS module 504 can also include the non-shared resources 540 local to the LPPS module 504. According to an aspect, the control module 506 can maintain a listing of the non-shared resources 522, 540, shared resources 538, and can further enable and disable access to each resource based on an operating state of the information handling system 500. The resource switching module 524 can further be coupled to one or more shared resources 538 accessible to the LPPS module 504 and the processing system chipset 502.

The control module 506 can also be coupled to an input interface 528 that can be coupled to any combination of, a keyboard, pointing device, touchpad, security module, etc. The control module 506 can also be coupled to a display 530 such as flat screen or flat panel display, touch screen, or any combination thereof. According to an aspect, the display can include a backlight and ambient light sensing (ALS) capabilities. The control module 506 can further be coupled to a power resource 532, which can also include a battery power source. The power resource 532 can include a processing system (PS) power 534 configured to power resources used with the processing system chipset 502. The power resource 532 can also include a LPPS power 504 configured to power resources used to provide a low-power processing system operating environment enabled using the LPPS module 504. Other outputs of the power resource 532 can also be used or enabled. Additionally, output of the PS power 534, RPE power 536, or any combination thereof can be increased or decreased as needed or desired to enable various resources of the information handling system 500.

According to a particular aspect, the processing system chipset 502 can be operated in a run-time operating mode, and can further access one or a combination of shared resources accessible to the LPPS module 504. For example, the processing system chipset 502 can offload processing to the LPPS module 504 by using the LPPS module 504 as a peripheral device. The control module 506 can initiate enabling the LPPS module 504 as a peripheral resource or device to the processing system chipset 502, or as a stand-alone operating environment that operate independent of the processing system chipset 502.

According to an aspect, the control module 506 can detect an operating condition of the processing system chipset 502 and the LPPS module 504. For example, a status listing that includes an operating status of various components of the information handling system 500 can be maintained by the control module 506 and accessed as needed or desired. For example, the processing system chipset 502 can be disabled and associated component of the processing system chipset 502 can be powered down. As such, the LPPS module 504 can be enabled and associated resources.

According to an aspect, a resource profile (not illustrated) can be stored within the control module 506. The resource profile can include a listing of resources of the information handling system 500 sufficient to process an event during a low power processing and run time or high processing of the information handling system 100. The LPPS module 504 and the control module 506 can initiate activation of resources based on the resource profile using the detected event, and resources available to process the event. As such, the information handling system 500 need not be initialized to process all events, and a limited amount of resources can be activated.

In another form, the information handling system 500 can detect a non-user initiated event communicated to an electronic device other than the information handling system 500 during a reduced operating state of the information handling system 500. For example, the LPPS module 504 can be configured to detect a message formatted to be received by a smart phone device, Blackberry device, or any type of electronic device configured to receive messages.

In an exemplary form, the information handling system 500 can be operating in a low-power processing mode that can include sufficient resources to detect a wireless signal. As such, the control module 506 can initiate enabling resources to process and output a response to the received wireless signal. As such, low-power processing can be used to output a response to a message, such as a Blackberry message, can be enabled using a limited amount of resources without having to initialize additional resources of the information handling system 400. For example, the LPPS module 504 in combination with the control module 506 can be used to enable access to the video output 526 and the LPPS video Mux isolation 516 of the processing system chipset 502 to output a received message. Additionally, a keyboard connected to the input interface 528 can be powered to enable a user to respond to a message. As such, a limited resource or low power processing can be used to receive and respond to messages without having to initialize the information handling system 500. As such, the information handling system 500 can be realized as a laptop or notebook system that can be used to receive messages that may be intended for a Blackberry or other type of messaging device, thereby allowing a user to view messages using a larger display relative to the Blackberry device or smart phone device, and draft and respond to messages using low power processing without having to provide a run time or high power consumption environment of the information handling system 502.

According to an aspect, the LPPS module 504 can include a LPPS processor such as a Texas Instruments (TI) OMAP 2430, 3430, Nvidia AP10, AP15, Motorola I.MX 32, 51, or any other processor that can be used as a processor within the LPPS module 504.

According to another aspect, the shared resources 538 can be stored local or remote to the LPPS module 504, and can store various applications or resources such as radio emulators, transcoders, encryption applications, security modules, GPS applications, biometric applications, camera applications, USB concentrator applications, Voice-Over-Internet Protocol (VOIP) applications, persistent hardware assisted virtual management, wake events, system management applications, one or more operating systems, file systems, various other peripheral resource applications and devices, patches, virus scanning software, security applications, or any combination thereof.

According to another aspect, the LPPS module 504 can be used as a separate system. For example, a user may desire to access a shared resource 538, non-shared resource 540, or any combination thereof when the information handling system 500 may be in a reduced operating mode. As such, the LPPS module 504 can be enabled without having to initialize the information handling system 500 to a run operating mode.

According to a further aspect, the control module 506 can be coupled to an LPPS power subsystem 534 operable to power various components of the information handling system 500 to enable a low-power processing environment. The control module 506 can also be coupled to a PS power subsystem 536 operable to enable various resources of the information handling system 500.

According to another aspect, the backlight/ALS module 530 can be coupled to the control module 506 via an SMBUS. The control module 506 can also be coupled to a LPPS power button (not illustrated) operable to initiate a low power processing of the information handling system 500 using the LPPS module 594. The control module 506 can also be coupled the input interface 528 that can include a keyboard that can include a qwerty keyboard having an email button, a calendar button, a contacts button, and an Internet access button (not illustrated). According to an aspect, the input interface 528 and additional function buttons alone or in combination, can be configured as a separate module or a part of another portion of the information handling system 500.

During operation, control module 506 can be configured to can detect a user initiated event, a non-user initiated event, or any combination thereof. For example, a user initiated event can include a user activating a key, button, or other type of hardware, software, or user selectable interface, or combinations thereof, that can generate a user activated event. For example, a user can select a button to access a messaging application of the information handling system 500. As such, the control module 506 can detect a request to access the messaging application and the LPPS module 504 can initiate access to resource of the information handling system 500 during a reduced operating state of the information handling system 500.

According to a further aspect, the LPPS module 504 can be operated in a run-time operating mode, and a portion of the processing system chipset 502 can be accessed to output video to the video output 526 of the processing system chipset 502. For example, the LPPS module 504 can output a video signal to the processing system chipset 502, and the processing system chipset 502 can multiplex the video signal using the LPPS video mux isolation 516. According to an aspect, the LPPS video mux isolation can be a physical mux device or in another form, can be realized as a contextual mux within a memory of the processing system chipset 502. For example, the LPPS video mux isolation 516 can include a memory buffer within the processing system chipset 502 dedicated to use by the LPPS module 504 when the LPPS module 504 is outputting a video signal. In this manner, the video output 526 can be accessed by the LPPS module 504 using the processing system chipset 502 without having to power the information handling system 500 to a full operating state. Additionally, a resource of the processing system chipset 502 can be used by the LPPS module 504 during a low power operating state thereby allowing use of shared resources within the information handling system 100 as needed or desired.

Figure 6:
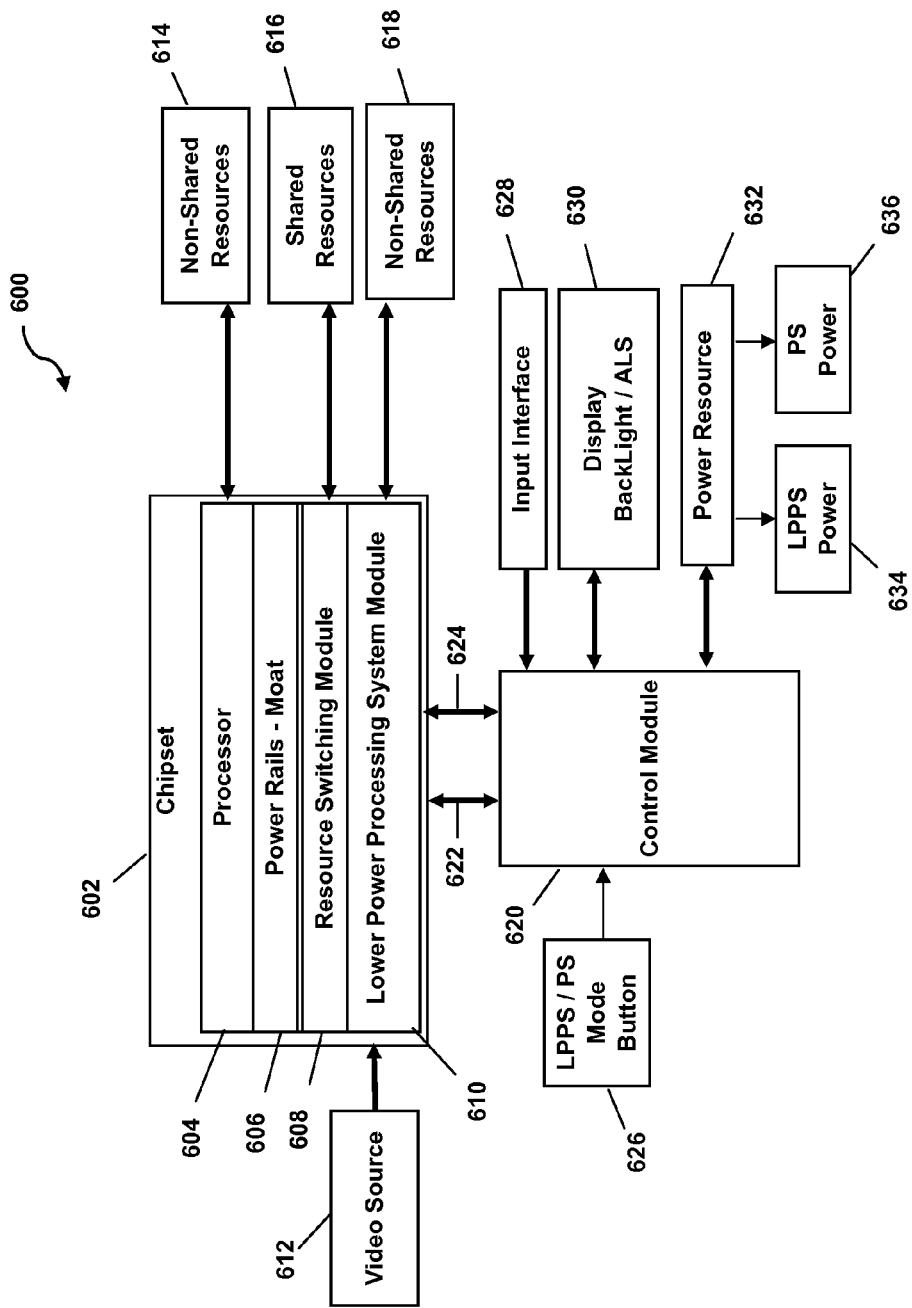
FIG. 6 illustrates a functional block diagram of a fully integrated low-power processing system enabled chipset according to an aspect of the disclosure.

FIG. 6 illustrates a functional block diagram of a fully integrated low-power processing system enabled chipset according to an aspect of the disclosure. An information handling system, generally illustrated at 600, can include a chipset 602 that can include a processor 604, power rails and moat 606, a peripheral switching module 608, and a low power processor 610. The chipset 602 can further include memory, a BIOS, a power system and sub-system, and various other modules or devices that can be integrated within the chipset 602. According to an aspect, the power rails—moat 606 can include a 3.3 Volt input signal that can be used to generate a 1.8 Volt signal, a 1.3 Volt signal, and a 1.2 Volt signal, or any combination thereof, to power various components of the chipset 602. Other voltages can also be used as needed or desired.

According to a further aspect, the chipset 602 can be coupled to a video buffer 612, and a control module 620. The control module can be coupled to the chipset using a bus 622 and a bus 624. In one form, the bus 622 can include a low pin count (LPC) bus and the bus 624 can include a system management bus (SMBUS). Other types of buses can also be employed. In other forms, buses 622, 624 can include any combination of a personal system 2 (PS2) bus, an RS232 bus, a serial peripheral interface (SPI bus), SMBUS, LPC, or other types of buses, and bus communication protocols, or any combination thereof.

According to an aspect, a peripheral interconnect (not illustrated) can also be coupled to the chipset 602. In other forms a universal serial bus (USB), USB 3, PCI bus, base controller (BC) bus, a PCI express (PCIE) bus, Firewire®, Gigabit Ethernet, secure digital input output (SDIO), systems management (SM), a display bus, various other types of buses, or any combination thereof, that can be employed by the chipset 602.

The chipset 602 can also be coupled to non-shared resources 614, shared resources 616, and non-shared resources 618. The resource switching module 608 can be used to switch access to shared resources. For example, the resource switching module 608 can enable processor 604 access to one or more shared resources 616. In other forms, the switching module 608 can enable low power processor 610 access to one ore more non-shared resources 618. As such, the resource switching module 608 can enable access to one or more shared resources 616. The resource switching module 608 can also be used to enable access to non-shared resources 614, 618.

The control module 620 can also be coupled to an input interface 628 that can be coupled to any combination of, a keyboard, pointing device, touchpad, security module, etc. The control module 620 can also be coupled to a display 630 such as flat screen or flat panel display, touch screen, or any combination thereof. According to an aspect, the display can include a backlight and ambient light sensing (ALS) capabilities. The control module 620 can further be coupled to a power resource 632, which can also include a battery power source. The power resource 632 can include a LPPS power 634 configured to power the low power processor 610 and associated resources to enable a low-power processing system operation of the information handling system 100.

According to another aspect, the power resource 632 can also include a processing system power button 636 configured to initiate powering the processor 604 and associated resources associated resources to enable a processing system operation of the information handling system 100.

According to a further aspect, an LPPS/PS operating mode button 626 can be coupled to the control module 620 to enable a low-power processing system operation of the information handling system 100, or the processing system operation of the information handling system 100. According to an aspect, the an LPPS/PS operating mode button 626, LPPS power button 634, the PS power button 636, or any combination thereof, can be realized as the same button.

During operation, the information handling system 600 can be used as either a processing system or a low-power processing system. For example, when used a processing system, a user may select the LPPS/PS mode button 626 or the PS power button 636, or various other combinations of buttons to access the processing system. Additionally, the chipset 604 can enable one or more power rails and one or more power moats to enable devices within the chipset 602. Additionally, resources and various other devices outside of the chipset 602 can be selectively enabled to enable a processing system having full or near full operating features and processing capabilities of the information handling system 100. Additionally, the resource switching module 608 can enable or disable access to shared resources 616 and non-shared resources 614, 618 as needed or desired.

According to a further aspect, the information handling system 600 can be used a low-power processing system. For example, when used a processing system, a user may select the LPPS/PS mode button 626 or the LPPS power button 634, or various other combinations of buttons to access the lower power processing system. Additionally, the chipset 604 can enable one or more power rails and one or more power moats to enable devices within the chipset 602. For example, the chipset 604 can enable power rails and one or more power moat to enable devices within the chipset 602 to provide a low-power processing environment. Additionally, resources and various other devices outside of the chipset 602 can be selectively enabled to enable a low-power processing system having reduced operating features and processing capabilities of the information handling system 100. Additionally, the resource switching module 608 can enable or disable access to shared resources 616 and non-shared resources 614, 618 as needed or desired. As such, through providing a chipset 602 having both a processor 604 and a low power processor 610, the information handling system 100 can be realized as processing system and a low-power processing system using the same chipset.

According to another aspect, the backlight can be controlled by the chipset and associated processor using a pulse width modulated signal that can be coupled directly to the backlight module. In other forms, the control module can control the backlight using an SM bus signal generated by the control module and operable to be used during the low power processing of the information handling system. In another form, the control module can generate the SM bus signal during a run operating of the information handling system as needed or required.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a processing system configured to operate using a power system configured to power a shared resource of the processing system and a non-shared resource of the processing system, and to disable the non-shared resource during a reduced operating state of the processing system;
a low-power processing system configured to access the shared resource of the processing system during operation of the low-power processing system, wherein the operation of the low-power processing system is separate from the operation of the processing system; and
a chipset including a processor of the processing system and operable to be enabled during operation of the processing system, wherein the processor is configured to be disabled during operation of the low-power processing system,
wherein the power system is further configured to enable a power rail of a first power subsystem and a power rail of a second power subsystem in response to an operating state of the processing system and operating state of the low-power processing system.

2. The information handling system of claim 1, further comprising a low-power processing module including a low power processor of the low-power processing system, wherein the low-power processing module is accessible to the chipset during operation of the processing system.

3. The information handling system of claim 1, further comprising:
wherein the chipset includes the low-power processing system;
wherein the power system is operable to enable the processing system separate from the low-power processing system; and
wherein the power system is further operable to enable the low-power processing system separate from the processing system.

4. The information handling system of claim 1, further comprising:
a low-power processing module externally coupled to the chipset;
a video processing resource within the chipset and accessible to the processing system during operation of the processing system;
wherein the video processing resource is accessible to the low-power processing module during operation of the low-power processing system and the reduced operating state of the processing system;
a power subsystem of the power system configured to enable a portion of the chipset; and
wherein the low-power processing system is configured to access the enabled portion of the chipset to output video using the shared resource of the processing system during the reduced operating state of the processing system.

5. The information handling system of claim 1, further comprising:
a video input source operably coupled to the chipset during operation of the low-power processing system;
a video output resource of the processing system configured to identify the video input source; and
wherein the video output resource is configured to process a video input from the video input source to a display format of the display.

6. The information handling system of claim 1, further comprising:
wherein the chipset includes a low power processor of the low-power processing system; and
a peripheral switching module integrated within the chipset and configured to couple an output of the chipset to the shared resource during use of the processor and the low power processor.

7. The information handling system of claim 3, further comprising:
a video processing resource within the chipset and accessible to the processing system during operation of the processing system; and
wherein the video processing resource is accessible to the low-power processing system during operation of the low-power processing system.

8. The information handling system of claim 5, further comprising a power subsystem configured to enable the video output resource.

9. The information handling system of claim 7, wherein the video processing resource includes:
a video raster coupled to the chipset and operable to be accessed as a shared video output resource; and wherein the video raster is further accessible to the low-power processing system and the processing system to simultaneously output video of the low-power processing system and video of the processing system to a shared video display resource.

10. A chipset comprising:
a processor configured to access a shared resource of a processing system during operation of the processing system;
a power system configured to enable a powering of the shared resource during operation of the processing system and operation of a low-power processing system;
a video multiplexing layer powered by the power system, the video multiplexing layer configured to receive a processing system video input and a low-power processing system video input, and to up-scale a video output by combining the processing system video input with the low-power processing system video input prior to outputting the video output; and
a peripheral switching module configured to couple an output to the shared resource during use of processing system and the low-power processing system.

11. The chipset of claim 10, further comprising:
a low power processor subsystem power source configured to be enabled in response to enabling a low power processor of the low-power processing system separate from the processing system.

12. The chipset of claim 10, wherein the shared resource includes:
a video display accessible to the low-power processing system during operation of the low-power processing system; and
wherein the video display is accessible to the processing system during operation of the processing system.

13. The chipset of claim 10, wherein the processor is a part of the processing system.

14. The chipset of claim 10, further comprising a low power processor of the low-power processing system.

15. The chipset of claim 10, further comprising:
a low power processor of the low-power processing system; and
wherein the processor is a part of the processing system.

16. An information handling system comprising:
a processing system configured to operate using a power system configured to power a shared resource of the processing system and a non-shared resource of the processing system, and to disable the non-shared resource during a reduced operating state of the processing system;
a low-power processing system configured to access the shared resource of the processing system during operation of the low-power processing system, wherein the operation of the low-power processing system is separate from the operation of the processing system; and
a chipset including a processor of the processing system and operable to be enabled during operation of the processing system, wherein the processor is configured to be disabled during operation of the low-power processing system,
wherein the chipset includes a low power processor of the low-power processing system; and
a peripheral switching module integrated within the chipset and configured to couple an output of the chipset to the shared resource during use of the processor and the low power processor.

17. The information handling system of claim 16, further comprising a low-power processing module including a low power processor of the low-power processing system, wherein the low-power processing module is accessible to the chipset during operation of the processing system.

18. The information handling system of claim 17, further comprising:
  wherein the chipset includes the low-power processing system;
  wherein the power system is operable to enable the processing system separate from the low-power processing system; and
  wherein the power system is further operable to enable the low-power processing system separate from the processing system.

19. The information handling system of claim 18, further comprising:
  a video processing resource within the chipset and accessible to the processing system during operation of the processing system; and
  wherein the video processing resource is accessible to the low-power processing system during operation of the low-power processing system.

20. The information handling system of claim 19, wherein the video processing resource includes:
  a video raster coupled to the chipset and operable to be accessed as a shared video output resource; and
  wherein the video raster is further accessible to the low-power processing system and the processing system to simultaneously output video of the low-power processing system and video of the processing system to a shared video display resource.

* * * * *